United States Patent [19]

Jewell et al.

[11] 3,881,256
[45] May 6, 1975

[54] THICKNESS GAGE
[75] Inventors: Jack Jewell, Springfield, Ohio;
 Virgil D. Ferguson, McGregor;
 Sherald J. Anderson, Waco, both of Tex.
[73] Assignee: The United States of America as represented by the Secretary of the Navy, Washington, D.C.
[22] Filed: Feb. 21, 1974
[21] Appl. No.: 444,577

[52] U.S. Cl. ............................. 33/172 R; 33/169 F
[51] Int. Cl. .............................................. G01b 5/06
[58] Field of Search ........ 33/169 B, 169 FR, 174 D, 33/172 R

[56] References Cited
UNITED STATES PATENTS
| 1,927,821 | 9/1933 | Abbott | 33/169 F |
| 3,075,290 | 1/1963 | Brook | 33/169 B |
| 3,168,784 | 2/1965 | Morrissey | 33/169 F |
| 3,432,933 | 3/1969 | Wood | 33/169 F |
| 3,479,743 | 11/1969 | Zemberry | 33/169 B |

FOREIGN PATENTS OR APPLICATIONS
267,925 9/1967 U.S.S.R. ............................. 33/169 F

Primary Examiner—Richard E. Aegerter
Assistant Examiner—John W. Shepperd
Attorney, Agent, or Firm—R. S. Sciascia; Charles D. B. Curry

[57] ABSTRACT

A penetration gage for measuring the thickness of an elastomeric liner without removing the liner from the case. A pin is driven through the liner until it contacts the case; while holding the pin in contact with the case, a gage surface is lowered until it contacts the outside surface of the liner. The attitude is then adjusted to yield a minimum reading on the dial indicator.

1 Claim, 2 Drawing Figures

PATENTED MAY 6 1975 3,881,256
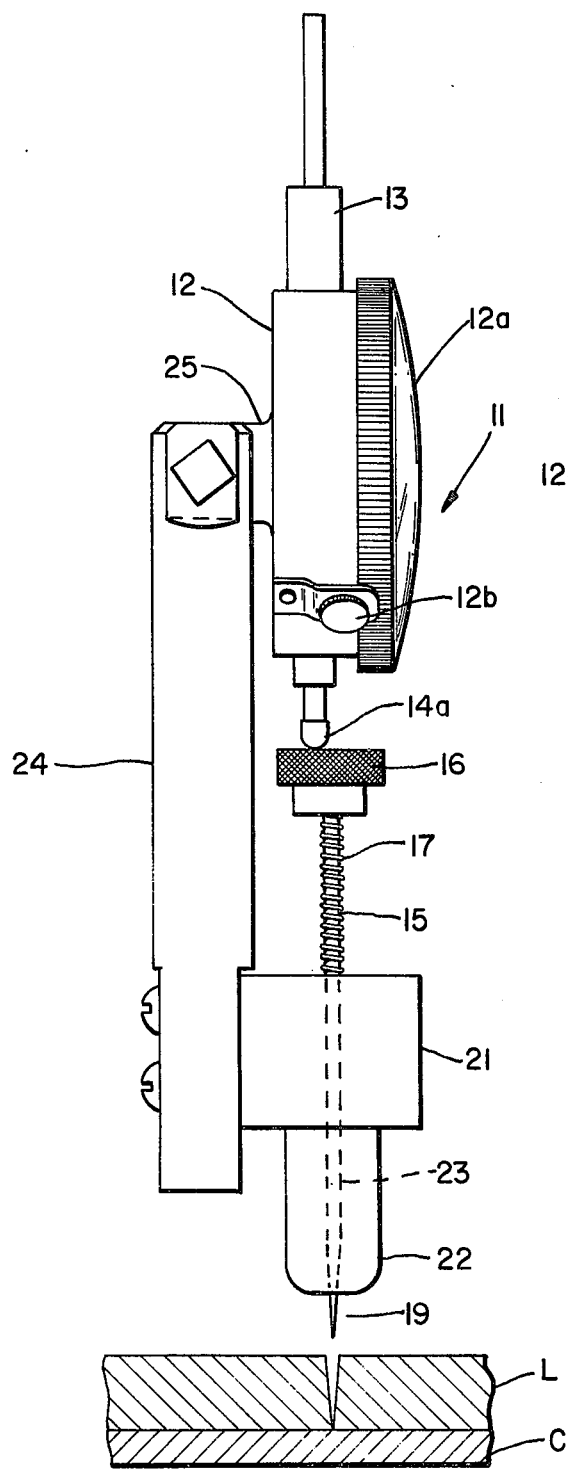
FIG_1
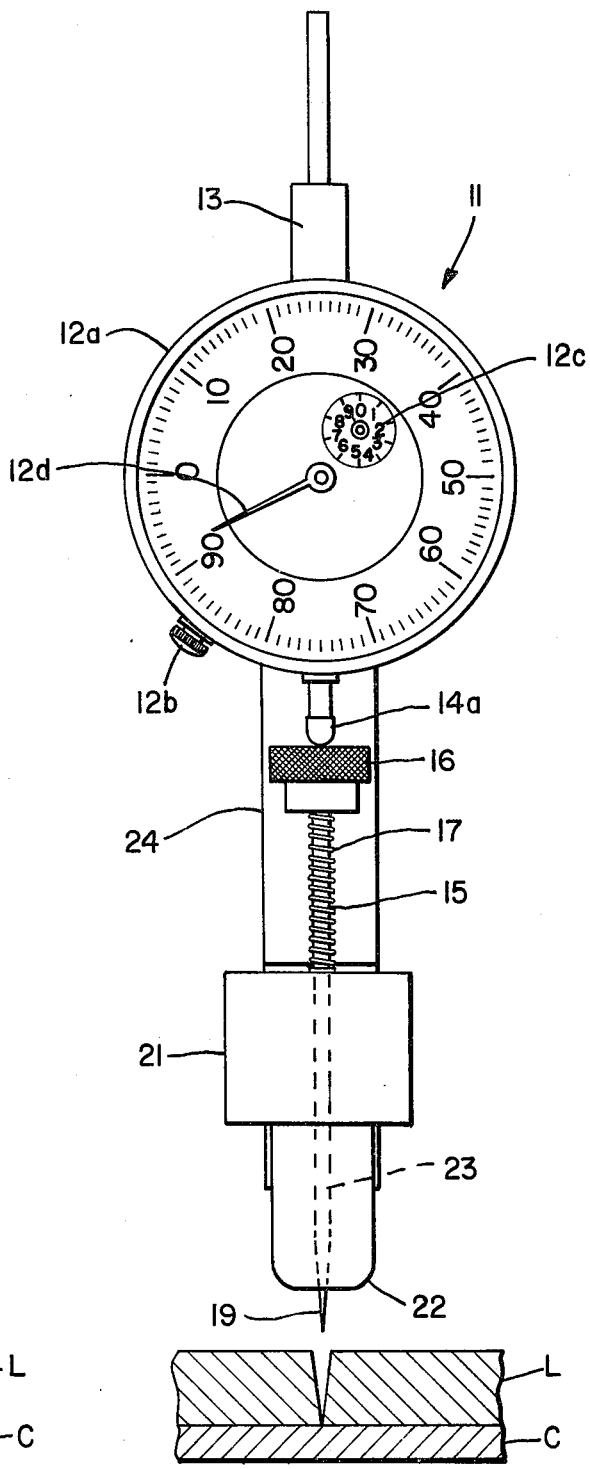
FIG_2

THICKNESS GAGE

BACKGROUND OF THE INVENTION

1. Field of the Invention

The subject matter of the present invention is a penetration gage with positive index features, and more particularly a penetration gage for measuring the thickness of an elastomeric material without removing the material from the base material.

2. Description of the Prior Art

The old methods and devices required removal of the elastomeric liner material to measure the material. This resulted in stretching and damage of the material as well as yielding questionable results.

SUMMARY OF THE INVENTION

Briefly, the present invention is a penetration gage for measuring the thickness of an elastomeric liner without removing the liner from the case. A pin is driven through the liner until it contacts the case; while holding the pin in contact with the case, a gage surface is lowered until it contacts the outside surface of the liner. The attitude is then adjusted to yield a minimum reading on the dial indicator.

STATEMENT OF THE OBJECTS OF THE INVENTION

A primary object of the present invention is to provide a penetration gage for measuring the thickness of an elastomeric liner without removing the liner from its casing.

Another object of the present invention is to find a method for determining the thickness of an elastomeric liner, quickly and economically.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a side view of the gage, parts being broken away for clarity.

FIG. 2 is a front view of the gage of FIG. 1.

DESCRIPTION OF THE PREFERRED EMBODIMENT

Referring to FIGS. 1 and 2, thickness gage 11 is generally comprised of zero dial indicator 12, pin 15 and gage surface 22. Zero dial indicator 12 is comprised of movable scale 12a, thumb screw 12b, fixed scale 12c, pointer 12d, spindle guide 13, and spindle 14. Zero dial indicator 12 is a standard zero reading device which is well known in the art, therefore a complete description of the zero dial indicator and its accompanying function is deemed unnecessary.

A scale device similar to the gage illustrated in U.S. Pat. No. 3,432,933 could be modified for use or any other equivalent device which can be adjusted to indicate a zero reading may be used in lieu of the illustrated zero dial indicator.

Pin 15 includes head 16, biasing member 17, and pin point 19. Biasing member 17 may be a spring or its equivalent. The spindle base 14a is in operative contact with head 16. The pin guide yoke 21 includes gage surface 22 and pin guide 23. Pin 15 is inserted to guide 23 and is biased by bias member 17 with respect to pin guide yoke 21. Pin guide yoke 21 is attached to base 24 while zero dial indicator 12 is attached to base 24 through offset attaching member 25. Offset attaching member 25 allows spindle base 14a to be in operative contact with head 16.

Gage 11 is adjusted to read zero by aligning end of point 19 with gage surface 22, loosening thumb screw 12b, rotating movable scale 12a until zero on scale is aligned with pointer 12d and tightening thumb screw 12b.

In operation pin point 19 of pin 15 is driven through liner L until it contacts case C. While holding pin point 19 in contact with case C, gage surface 22 is lowered until it is in contact with the surface of liner L. The attitude of gage 11 is adjusted to yield a minimum reading on the dial indicator 12. This minimum reading is the average liner thickness under gage surface 22. This gage 11 allows a rapid and accurate measurement of the liner thickness without otherwise removing liner from case.

What is claimed is:

1. A thickness gage for measuring the thickness of an elastomeric liner, said liner being located in an enclosed casing comprising:
   a. a base;
   b. a zero dial indicator operably connected to the upper end of said base, said zero dial indicator having a spindle downwardly depending therefrom;
   c. a pin assembly operably connected to the lower end of said base;
   d. said pin assembly including a pin, a pin guide, a pin guide yoke, a spring and a head;
   e. said pin having a pin point formed at the lower end and said head being attached to the upper end thereof, said head being in contact with said spindle;
   f. said spring surrounding the upper region of said pin and positioned between said head and said pin guide yoke;
   g. said pin guide surrounding the lower region of said pin and said pin guide yoke surrounding the middle region of said pin; and
   h. the upper part of said pin guide being operably connected to the lower region of said pin guide yoke and said pin guide yoke being connected to lower end of said base.

* * * * *